June 3, 1958  G. B. WATKINS ET AL  2,837,454
LAMINATED TRANSPARENT ARTICLE AND METHOD
OF MAKING THE SAME
Filed Sept. 23, 1954

Inventors
George B. Watkins and
James D. Gwyn
Nobbe & Swope
Attorneys

United States Patent Office 2,837,454
Patented June 3, 1958

---

2,837,454

LAMINATED TRANSPARENT ARTICLE AND METHOD OF MAKING THE SAME

George B. Watkins, Toledo, and James D. Gwyn, Perrysburg, Ohio, assignors to Libbey-Owens-Ford Glass Company, Toledo, Ohio, a corporation of Ohio Application September 23, 1954, Serial No. 457,968

10 Claims. (Cl. 154—2.75)

---

The present invention relates broadly to a laminated article and to a method of preparing the same. More particularly, this invention relates to a method of laminating polyester plastics to other sheet materials.

Laminated safety glass ordinarily comprises two sheets of glass and an interposed layer of tough, transparent plastic material adherent to the inner surfaces thereof. It is desirable in the manufacture of such products that the plastic interlayer have good strength properties. It is also necessary to have a plastic interlayer which may be securely bonded to adjacent sheets of glass so that the resulting product may be used for extended periods of time. It has been found that the polyester plastic product of terephthalic acid and ethylene glycol is such a strong, tough plastic material.

In glazing closures where the plastic interlayer is extended beyond the edges of the glass sheets and used for fastening the transparent unit to a frame, it is particularly important to have a tough plastic interlayer. The above mentioned polyester plastic has the desired strength characteristics but is extremely difficult to bond to other transparent sheet materials, such as for example glass and polyvinyl butyral.

Accordingly, it is an important object of this invention to provide a method of laminating polyester plastics made from terephthalic acid and glycols with other transparent sheet materials, and particularly the laminating of polyester plastics with polyvinyl butyral.

Another object of this invention is to provide a laminated glass structure in which the interlayer is of polyester plastic and which may be securely bonded to a sheet of polyvinyl butyral plastic.

A further object is the provision of such a laminated glass in which the polyester plastic interlayer extends beyond the glass sheet or sheets to provide a strong, flexible attaching flange.

It has now been found that the above and other objects can be accomplished by treating surfaces of plastic sheets made from the reaction product of terephthalic acid and glycol, with an alkaline solution, before laminating with polyvinyl butyral. This alkaline treatment has the effect of bringing free polar groups onto the surface of the polyester plastic, which polar groups cause the polyester product to adhere to plastics such as polyvinyl butyral to provide a strong permanent adhesion between the two plastic materials.

In the accompanying drawings in which like numerals are used to designate like parts throughout:

Figure 2:
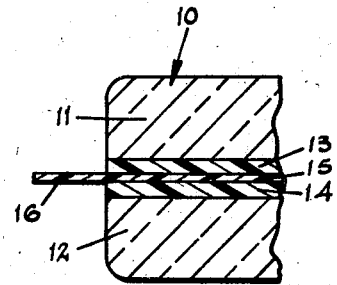
Fig. 2 is a sectional view taken along the line 2—2 of Fig. 1.

Referring now to the drawings and more particularly to Fig. 2, there is shown a laminated glass article generally designated by the numeral 10 including sheets of glass 11 and 12, polyvinyl butyral sheets 13 and 14 and a sheet of polyester plastic 15 all bonded together to provide a unitary structure.

Figure 1:
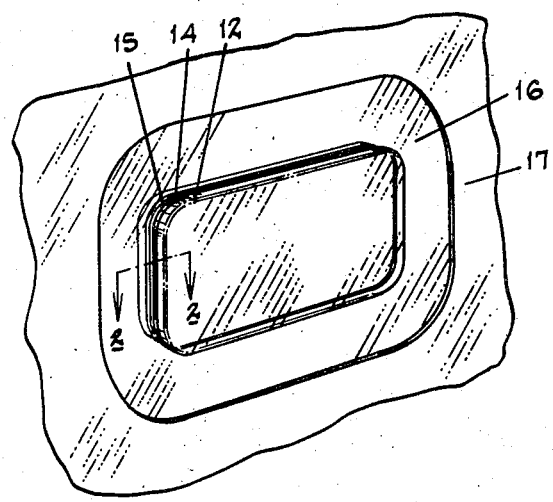
Fig. 1 is a perspective view of a laminated article constructed in accordance with this invention and employed as a glazing closure.

Especially good results are obtained when the polyester plastic 15 is composed of the reaction product of terephthalic acid and ethylene glycol. The sheets 13 and 14 are each securely adhered to respective sides of the polyester sheet 15 and also to the sheets of glass 11 and 12. Preferably, an attaching flange 16 is provided by the polyester plastic 15 which extends beyond the sheets 13 and 14 of polyvinyl butyral and which can be secured to the body 17 of an airplane or other unit as shown in Fig. 1.

Figure 3:
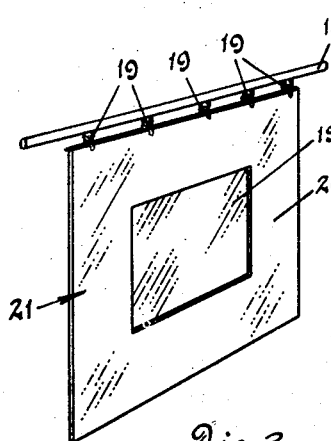
Fig. 3 is a perspective view illustrating an early step in the process of this invention in which the polyester plastic is prepared for treatment.

In the process of laminating these materials together, a sheet of polyester plastic 15 is hung from a member 18 by fastening clips 19, as shown in Fig. 3. The attaching flange 16 of the polyester plastic 15 is masked off with a suitable material such as masking tape 20 to provide a masked polyester sheet which is generally designated by the numeral 21. This leaves the surfaces of the body or main area of the polyester sheet 15, located inwardly of the attachment flange 16, exposed for treatment with alkaline materials.

Figure 4:
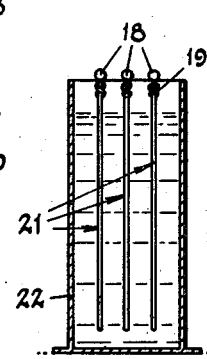
Fig. 4 is a cross-sectional view illustrating the treatment of the polyester plastic.
Figure 5:
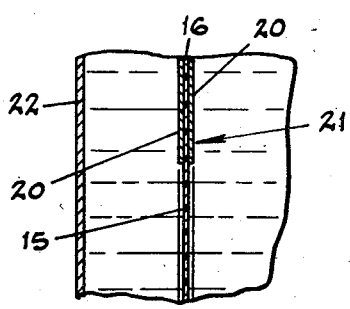
Fig. 5 is an enlarged fragmentary view of Fig. 4 illustrating the treatment of the polyester plastic in greater detail.

As shown in Figs. 4 and 5, the masked sheets 21 are suspended in an alkaline solution which is held in a tank 22 for a time sufficient to render the surface of the polyester properly adherable to the polyvinyl butyral sheet to be attached thereto. By way of example, a treating period of two hours is sufficient to provide adequate adherence to polyvinyl butyral when the tank 22 is filled with a 7% solution by weight of sodium hydroxide in water and maintained at a temperature of 175 to 200° F. In general, a hot alkaline solution will be used and the time required will be from one to three hours. However, it is contemplated that other alkalies and other alkaline concentrations may be used at a variety of different temperatures and for varying periods of time. As shown in Fig. 5, the masking tape 20 prevents contact of the alkaline solution with the attachment flange 16 during this treatment.

Figures 6, 7:
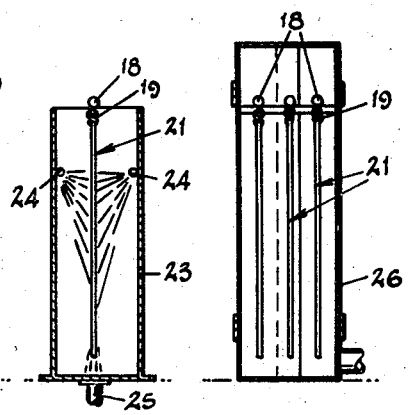
Figs. 6 and 7 are sectional views illustrating later steps in the process of this invention.

After the sheet 21 has been subjected to the alkaline treatment, it is removed from container 22 and placed in a container 23 having sprayers 24 and a drain 25 as illustrated in Fig. 6. Water is sprayed from the sprayers 24 onto the sheets 21 to remove all of the alkaline material adhering to the sheet. After the sheet 21 has been rinsed, it is placed in an enclosure 26 as shown in Fig. 7 where it is dried in a controlled atmosphere.

The masking material 20 is then removed from the polyester sheet 15, and polyvinyl butyral sheets 13 and 14 are placed on each side of the polyester sheet 15, and glass sheets 11 and 12 are placed in face-to-face relation to the polyvinyl butyral sheets 13 and 14. The assembled unit 10 is then placed in suitable pliable bags and subjected to heat and pressure in an autoclave using any of the conventional processes for laminating glass to polyvinyl butyral.

Figure 8:
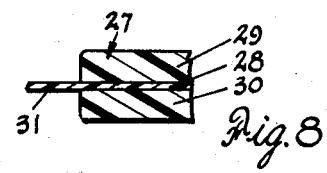
Fig. 8 is the partial sectional view of a laminated article of another embodiment of this invention.

In the embodiment illustrated in Fig. 8 there is disclosed a laminated unit 27 having an interlayer 28 formed of a polyester sheet which is the reaction product of terephthalic acid and ethylene glycol and two sheets of polyvinyl butyral plastic 29 and 30 adhered in face-to-face relation to the polyester interlayer 28. The polyester sheet 28 may also be extended beyond the polyvinyl butyral sheets 29 and 30 to provide an attaching flange 31 for securing the laminated panel 27 to suitable frame members in providing a transparent closure. This embodiment is made by a process similar to that disclosed in Figs. 1 to 7.

By treating the terephthalic acid and ethylene glycol plastic with alkaline solutions before laminating with polyvinyl butyral, there is provided a method of causing these two plastics to adhere without the addition of any other adhesive material. This results in a clear, transparent laminated panel which can be produced by relatively simple and practical processes. It is contemplated that other glycols than ethylene glycol can be used in the production of the polyester plastic in this invention. For example, terephthalic acid may be united with propylene glycol, diethylene glycol or others to produce a polyester plastic applicable for use in this invention. The polyvinyl butyral of this invention includes any polyvinyl butyral which can be laminated to glass in a conventional manner.

Alkaline solutions may be made from any of the common bases such as sodium hydroxide, potassium hydroxide, lithium hydroxide, and ammonium hydroxide. The temperature and time of treatment will depend upon the alkalinity of the treating solutions. The treatment must be sufficient to provide enough polar groups on the surface of the polyester resin to effect a permanent bond.

The laminated article of this invention may be used wherever it is desired to have a strong plastic interlayer. It is also contemplated that other types of sheet material such as acrylic resins may be substituted for the glass sheets 11 and 12 in Fig. 2 to provide laminated units that are of particular value in aircraft construction when glass sheets are not desired.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

We claim:

1. A method of making a laminated transparent sheet material, comprising treating the surface of a sheet of polyester plastic with a hot alkaline solution, said polyester plastic including the reaction product of terephthalic acid and a glycol, placing a sheet of polyvinyl butyral plastic material over the treated surface, and subjecting the sheets to heat and pressure.

2. A method of making laminated transparent sheet material, comprising treating the surfaces of a sheet of polyester plastic consisting essentially of terephthalic acid and ethylene glycol with a hot alkaline solution, placing a sheet of polyvinyl butyral plastic over each of said treated surfaces, and subjecting the sheets to heat and pressure.

3. A method of making laminated transparent sheet material, comprising treating the surfaces of a sheet of polyester plastic with a hot alkaline solution, said polyester plastic consisting essentially of the reaction product of terephthalic acid and a glycol, placing a sheet of polyvinyl butyral plastic material over each of said treated surfaces, placing a piece of transparent sheet material over each sheet of polyvinyl butyral plastic, said transparent sheet material having the property of adhering to the polyvinyl butyral when subjected to heat and pressure, and subjecting all of the sheets to heat and pressure whereby a composite laminated unit is produced.

4. A method of making laminated transparent sheet material, comprising treating the surfaces of a sheet of polyester plastic consisting essentially of the reaction product of terephthalic acid and ethylene glycol with a hot alkaline solution, placing a sheet of polyvinyl butyral plastic over each of said treated surfaces, placing a sheet of glass adjacent each sheet of polyvinyl butyral plastic and subjecting the sheets to heat and pressure to provide a composite laminated unit.

5. A method of making laminated transparent sheet material, comprising treating an area of both faces of a sheet of polyester plastic consisting essentially of the reaction product of terephthalic acid and ethylene glycol with a hot alkaline solution, placing a sheet of polyvinyl butyral plastic over each of the treated surfaces, said sheets of polyvinyl butyral plastic being of a smaller area than the said polyester plastic and congruent to the treated area, placing sheets of glass having faces substantially congruent to the faces of polyvinyl butyral plastic in corresponding face-to-face relation, and subjecting the sheets to heat and pressure to produce a single laminated article.

6. A method of making a laminated transparent sheet material, comprising treating an area of both faces of a sheet of polyester plastic consisting essentially of the reaction product of terephthalic acid and ethylene glycol with a weak alkaline solution for a period of one to three hours at a temperature of 175 to 200° F., placing a sheet of polyvinyl butyral plastic over each of the treated surfaces, said sheets of polyvinyl butyral plastic being of a smaller area than the said polyester plastic and congruent to the treated area, placing sheets of glass having faces substantially congruent to the faces of polyvinyl butyral plastic in corresponding face-to-face relation, and subjecting the sheets to heat and pressure to produce a single laminated article.

7. A method of making a laminated transparent sheet material, comprising treating an area of both faces of a sheet of polyester plastic consisting essentially of the reaction product of terephthalic acid and ethylene glycol with a weak alkaline solution for a period of one to three hours at a temperature of 175 to 200° F., rinsing the treated sheet with water to remove the alkali, drying the rinsed sheet, placing a sheet of polyvinyl butyral plastic over each of the treated surfaces, said sheets of polyvinyl butyral plastic being of a smaller area than the said polyester plastic and congruent to the treated area, placing sheets of glass having faces substantially congruent to the faces of polyvinyl butyral plastic in corresponding face-to-face relation therewith, and subjecting the sheets to heat and pressure to produce a single laminated article.

8. A laminated transparent article, comprising a sheet of polyester plastic consisting essentially of a reaction product of terephthalic acid and a glycol compound and having a surface thereof treated with a hot alkaline solution, and a sheet of polyvinyl butyral plastic material permanently bonded to the treated side of said sheet of polyester plastic.

9. A laminated glass comprising a sheet of polyester plastic, consisting essentially of the reaction product of terephthalic acid and ethylene glycol and having its surfaces treated with a hot alkaline solution, two sheets of polyvinyl butyral plastic, and two sheets of glass, each sheet of polyvinyl butyral having one surface adhesively attached to a surface of said polyester plastic and the other surface adhesively attached to the surface of one of said sheets of glass.

10. A laminated glass comprising a sheet of polyester plastic, consisting essentially of the reaction product of terephthalic acid and ethylene glycol, two sheets of polyvinyl butyral plastic material having faces of a smaller area than the faces of said polyester plastic and two sheets of glass having faces substantially congruent to the faces of the polyvinyl butyral plastic material, each sheet of polyvinyl butyral having one surface adhesively attached to a face of said polyester plastic with the marginal area of the polyester plastic extending beyond each sheet of polyvinyl butyral and the other surface of each sheet of polyvinyl butyral adhesively attached to the surface of one of said sheets of glass.

References Cited in the file of this patent

UNITED STATES PATENTS

| | | |
|---|---|---|
| 2,191,367 | Carothers | Feb. 20, 1940 |
| 2,229,781 | Weihe et al. | Jan. 28, 1941 |
| 2,526,728 | Burk et al. | Oct. 24, 1950 |
| 2,650,213 | Hofrichter | Aug. 25, 1953 |
| 2,785,085 | Sayre | Mar. 12, 1957 |